(12) United States Patent
Subhan et al.

(10) Patent No.: US 10,327,274 B2
(45) Date of Patent: Jun. 18, 2019

(54) MOBILE DEVICE ANCHORING AND CONNECTIVITY ACROSS MULTIPLE MOBILE NETWORK TECHNOLOGIES

(71) Applicant: Verizon Patent and Licensing Inc., Arlington, VA (US)

(72) Inventors: Abdul Subhan, Wayne, NJ (US); Paul H. Siedelhofer, Robbinsville, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 107 days.

(21) Appl. No.: 15/291,395

(22) Filed: Oct. 12, 2016

(65) Prior Publication Data

US 2018/0103498 A1 Apr. 12, 2018

(51) Int. Cl.
| | |
|---|---|
| *H04W 76/15* | (2018.01) |
| *H04W 24/08* | (2009.01) |
| *H04L 29/12* | (2006.01) |
| *H04W 48/18* | (2009.01) |
| *H04W 76/12* | (2018.01) |

(Continued)

(52) U.S. Cl.
CPC ......... *H04W 76/15* (2018.02); *H04L 61/2007* (2013.01); *H04W 24/08* (2013.01); *H04W 40/12* (2013.01); *H04W 48/18* (2013.01); *H04W 76/12* (2018.02); *H04W 76/25* (2018.02); *H04L 61/1588* (2013.01); *H04W 84/042* (2013.01)

(58) Field of Classification Search
CPC . H04W 76/22; H04W 28/0289; H04W 36/12; H04W 36/22; H04W 76/025; H04W 76/15; H04W 28/02; H04W 28/0215; H04W 28/0263; H04W 28/08; H04W 28/085; H04W 28/12; H04W 36/0083; H04W 36/08

See application file for complete search history.

(56) References Cited

U.S. PATENT DOCUMENTS

| | | | |
|---|---|---|---|
| 2012/0039262 A1* | 2/2012 | Walsh | H04L 45/04 370/329 |
| 2014/0169330 A1* | 6/2014 | Rommer | H04W 36/08 370/331 |

(Continued)

OTHER PUBLICATIONS

Ford et al., Architectural Guidelines for Multipath TCP Development, IETF RFC 6182, published Mar. 2011.*

*Primary Examiner* — Asad M Nawaz
*Assistant Examiner* — Zhaohui Yang (57) ABSTRACT

A device may attach to a mobile service provider (MSP) network and establish a first communication path from the device to a packet data network (PDN) gateway in the MSP network. The device may also start a session over the first communication path and detect a wireless network which is available for establishing a second communication path that extends from the device to the PDN gateway over the wireless network. While the first communication path is intact, the device may: attach the device to the MSP network over the wireless network, wherein attaching the device over the wireless network includes establishing a second communication path from the device to the PDN gateway over the wireless network; evaluate conditions for the first communication path and the second communication path; and select one of the first and second communication paths as an active communication path based on the evaluated conditions.

20 Claims, 7 Drawing Sheets

(51) Int. Cl.
*H04W 76/25* (2018.01)
*H04W 40/12* (2009.01)
*H04W 84/04* (2009.01)

(56) References Cited

U.S. PATENT DOCUMENTS

2016/0073299 A1* 3/2016 Liang ................ H04W 36/0022
370/331
2017/0111792 A1* 4/2017 Correia Fernandes ......................
H04L 63/0272

* cited by examiner

MOBILE DEVICE ANCHORING AND CONNECTIVITY ACROSS MULTIPLE MOBILE NETWORK TECHNOLOGIES

BACKGROUND INFORMATION

A network service provider may offer a variety of communication services, such as an Internet service, email services, telephone service, texting service, Voice-over-Internet Protocol (VoIP) service, content delivery service, etc. In recent years, with the advent of smart phones, service providers have been witnessing increasing use of such services over wireless networks. In contrast to wireline networks, however, wireless communication sessions are more easily disrupted due to noise, occluded signals, interference, etc.

DETAILED DESCRIPTION OF PREFERRED EMBODIMENTS

The following detailed description refers to the accompanying drawings. The same reference numbers in different drawings may identify the same or similar elements.

As used herein, the term "session" may refer to interchange of information between one or more devices. A session may have a start time and an end time.

In the following, a user device may establish a session through multiple network paths, where each path is set up over a different wireless network. The user device may monitor network conditions (e.g., traffic, noise, jitter, etc.), and at regular time intervals, the user device may select an optimal network path and send data (e.g., voice data, text data, video data, etc.) over the selected path. By maintaining connections with the multiple networks, the user device can decrease the likelihood of dropping a session, having interruptions, delays, noise, etc. Alternatively, the user device may distribute transmitted data over both paths, to increase the effective bandwidth between the other session endpoint.

Figure 1:
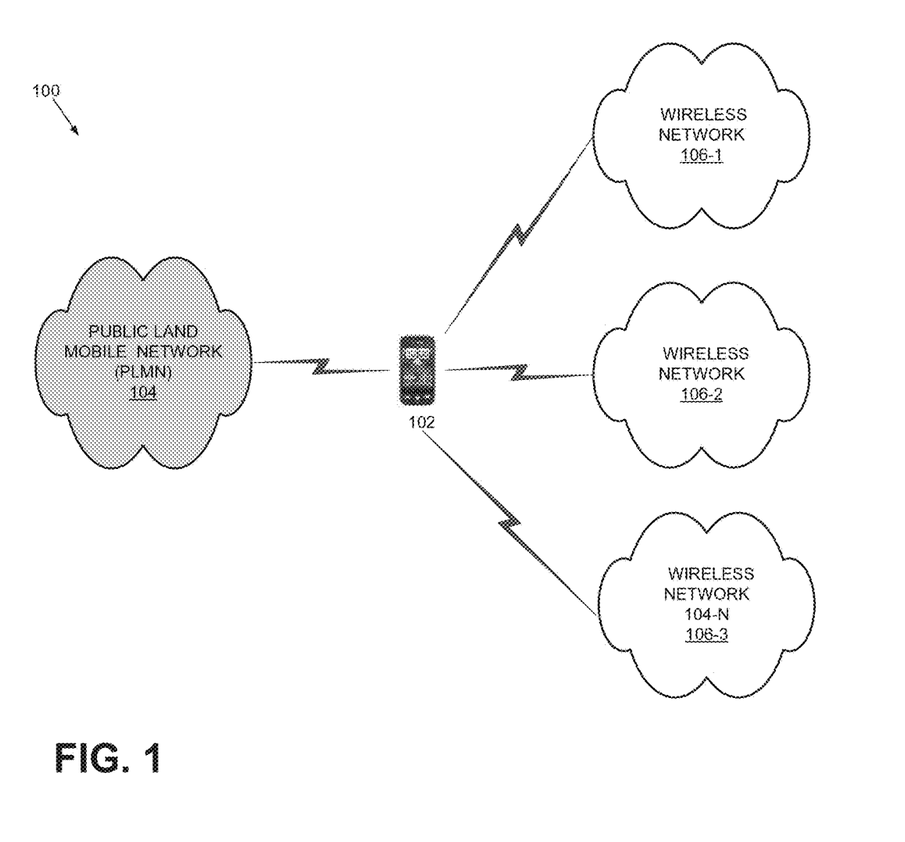
FIG. 1 illustrates an overview of an exemplary environment in which concepts described herein may be implemented.

FIG. 1 illustrates an overview of an exemplary environment 100 in which concepts described herein may be implemented. As shown, environment 100 includes a user device 102, a public land mobile network (PLMN) 104, and wireless networks 106-1, 106-2, and 106-3.

In FIG. 1, when user device 102 connects to PLMN 104, user device 102 may determine whether there are additional networks to which user device 102 can attach. If user device 102, for examples, determines that there are three available wireless networks 106-1, 106-2, and 106-3, user device 102 can initiate a connection to each of networks 106 and establish a path through each of networks 106. Because each network 106 provides a communication path independent of other paths on other wireless networks 106, if a given path fails (e.g., the path over wireless network 106-1), user device 102 can select another path (e.g., the path over wireless network 106-2) over which it can send data. Thus, by connecting to multiple networks 104 and 106, user device 102 increases the reliability of its session.

In another embodiment, wireless network 106 may not serve to provide a backup path, but another path through which user device 102 transmits data toward its communication endpoint. Thus, each of wireless networks 106 may provide user device 102 with additional bandwidth. In one example, user device 102 may transmit video clips over PLMN 104, wireless networks 106-1, and 106-3. In different implementations, another type of network may take the place of wireless network 106, such as another PLMN).

Figure 2:
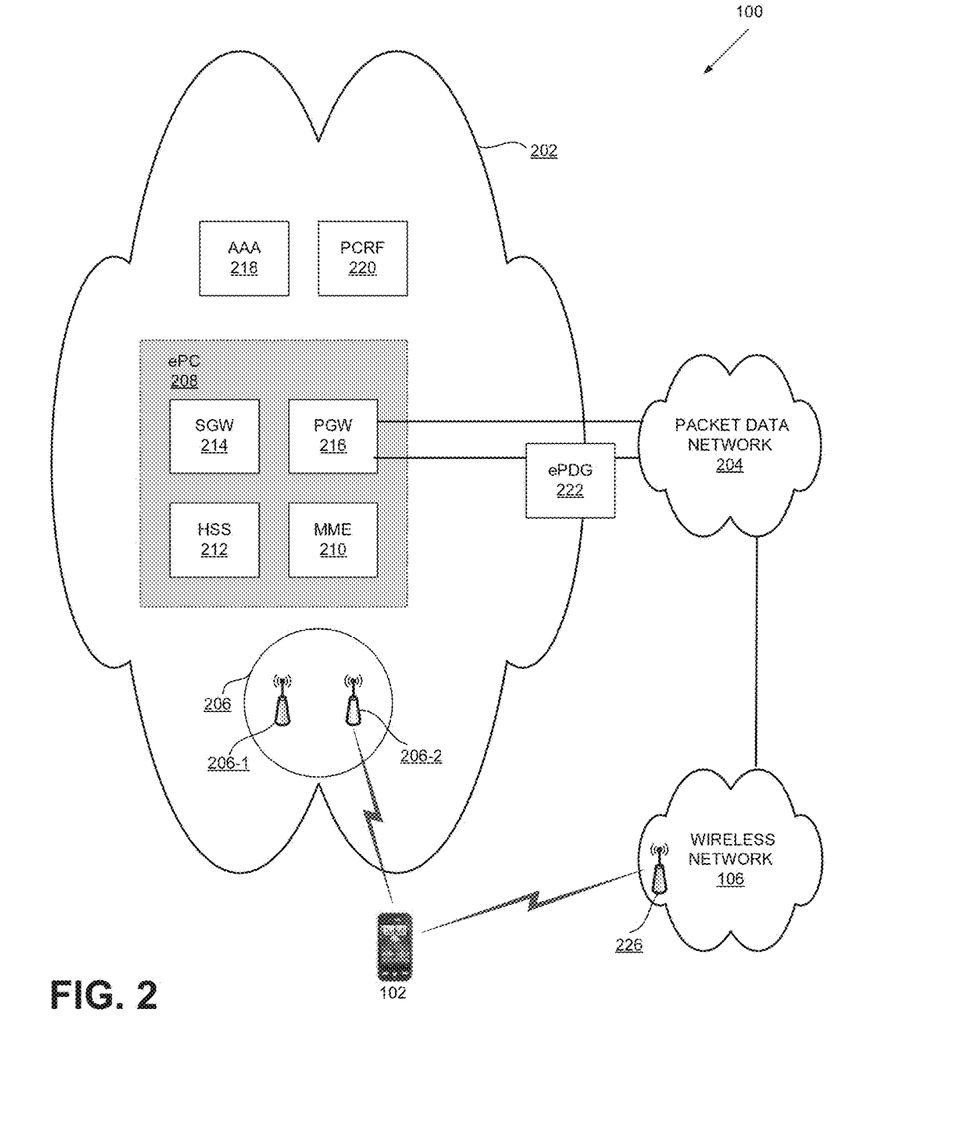
FIG. 2 illustrates a portion of the environment of FIG. 1.

FIG. 2 illustrates a portion of the environment of FIG. 1. As shown, environment 100 includes user device 102, wireless network 106, mobile service provider (MSP) network 202, and packet data network 204. Depending on the implementation, environment 100 may include additional or fewer components than those illustrated in FIG. 1. For example, in a different embodiment, environment 100 may include millions of user devices and/or additional wireless networks.

User device 102 may include an electronic device having communication capabilities. For example, user device 102 may include a smart phone, a wearable computer (e.g., a wrist watch, eye glasses, etc.), a tablet, a set-top box (STB), any type of internet protocol (IP) communications device, a voice over internet protocol (VoIP) device, a laptop computer, a palmtop computer, a gaming device, a media player device, or a digital camera that includes communication capabilities (e.g., wireless communication mechanisms). In a long-term evolution (LTE) environment, user device 102 may be referred to as user equipment (UE).

In FIG. 2, user device 102 may establish and participate in a communication session with other devices (not shown). To provide IP level (L3) connectivity over multiple paths, user device 102 may maintain an IP address (e.g., assign the IP address to an endpoint of a session with other devices over different networks). In addition, for each wireless network through which user device 102 is attached to MSP network 202, user device 102 receives an IP address. Hence, during a session with N wireless paths over N different wireless networks, user device 102 has N+1 IP addresses.

Each of wireless network 106 and MSP network 202 may include one or more wireless networks of any type, such as, for example, a local area network (LAN), a wide area network (WAN), wireless local area network (WLAN), and a wireless satellite network, and/or one or more wireless public land mobile networks (PLMNs). The PLMN(s) may include a Code Division Multiple Access (CDMA) 2000 PLMN, a Global System for Mobile Communications (GSM) PLMN, a Long Term Evolution (LTE) PLMN and/or other types of PLMNs not specifically described herein.

Packet data network (PDN) 204 may include a network that supports Internet Protocol (IP)-based communications. PDN 204 may include, for example, an IP Multimedia Subsystem (IMS) network, which may provide voice and multimedia services to user device 102 based on Session Initiation Protocol (SIP).

Depending on the implementation, MSP network 202 may include an LTE network that includes an evolved UMTS Terrestrial Network (eUTRAN) 206, evolved packet core (ePC) 208, Authentication Authorization and Accounting (AAA) server 218, a policy and charging rules function (PCRF) 220, and an evolved packet data gateway (ePDG) 222. As further shown in FIG. 2, ePC 208 may include a mobility management entity (MME) 210, a home subscriber server (HSS) 212, a serving gateway (SGW) 214, and a PDN-gateway (PGW) 216.

eUTRAN 206 may include one or more eNodeBs 206-1 and 206-2 (herein collectively referred to as "eNodeBs 206"). eNodeB 206 may include one or more devices and other components that allow user device 105 to wirelessly connect to MSP network 202. eNodeB 206-1 and eNodeB 206-2 may each interface with ePC 208 via an S1 interface, which may be split into a control plane S1-MME interface and a data plane S1-U interface. For example, the S1-MME interface may be between MME 210 and eNodeB 206-1. The S1-MME interface may be implemented, for example, with a protocol stack that includes a Network Access Server (NAS) protocol and/or Stream Control Transmission Protocol (SCTP).

The S1-U interface may be between SGW 214 and eNodeB 206-1. The S1-U interface may be implemented, for example, using a General Packet Radio Service Tunneling Protocol version 2 (GTPv2). eNodeB 206-1 may communicate with eNodeB 206-2 via an X2 interface. The X2 interface may be implemented, for example, with a protocol stack that includes an X2 application protocol and the SCTP.

MME 210 may provide control plane processing for ePC 208. For example, MME 210 may implement tracking and paging procedures for user device 102, may activate and deactivate bearers for user device 102, may authenticate a user of user device 102, and may interface to non-LTE radio access networks. A bearer may represent a logical channel with particular quality of service (QoS) requirements. MME 210 may also select a particular SGW 214 for a particular user device 102. A particular MME 210 may interface with other MME 210 in ePC 208 and may send and receive information associated with user devices 102, which may allow one MME to take over control plane processing of user devices 102 serviced by another MME, if the other MME becomes unavailable. During the authentication of user device 102 at MME 210, MME 210 may exchange messages with HSS 212 to verify or validate user device 102's identity.

MME 210 may communicate with SGW 214 through an S11 interface. S11 interface may be implemented, for example, using GTPv2. The S11 interface may be used to create and manage a new session for a particular user device 102. The S11 interface may be activated when MME 210 needs to communicate with SGW 214, such as when the particular user device 102 attaches to ePC 208, when bearers need to be added or modified for an existing session for the particular user device 102, when a connection to a new PGW 216 needs to be created, or during a handover procedure (e.g., when the particular user device 102 needs to switch to a different SGW 214).

HSS 212 may provide user subscription, registration, and profile information to other components in an LTE, and store such information, at itself or other components (e.g., AAA 218). For example, HSS 212 may store and/or access authentication information at AAA 218. When MME 210 requests HSS 212 for authentication data, HSS 212 may access AAA 218 to retrieve the data and provide it to MME 210.

SGW 214 may provide an access point to user device 102, handle forwarding of data packets for user device 102, perform transport level markings (e.g., QCI), and act as a local anchor point during handover procedures between eNodeBs 206. SGW 214 may interface with PGW 216 through an S5/S8 interface. The S5/S8 interface may be implemented, for example, using GTPv2.

PGW 216 may function as a gateway to PDN 204. In addition, when user device 102 attaches to MSP network 202 (through either eUTRAN 206 or through a wireless network), PGW 216 may allocate an IP address for user device 102. Additionally, PGW 216 may provide an extra IP address to user device 102. User device 102 can use the extra IP address to maintain a seamless flow of information across multiple paths. User device 102 can use the IP address, for example, to designate an endpoint of a communication session.

AAA 218 may store and/or provide authentication, authorization, and/or accounting information to components of MSP network 202. AAA 218 may provide such information in accordance with the DIAMETER protocol.

PCRF 220 may provide policy control decisions and flow based charging control functionalities. PCRF 220 may provide network control regarding service data flow detection, gating, quality of service (QoS) and flow based charging, etc. PCRF 220 may determine how a certain service data flow shall be treated, and ensure that user plane traffic mapping and treatment are in accordance with a user's subscription profile. For example, PCRF 220 may identify and apply a user profile related to user device 102 when exchanging data using a conventional handling procedure.

In some implementations, PCRF 220 may store rules and logic pertaining to establishment of multiple paths (e.g., through network 202 and wireless networks 106). For example, PCRF 220 may indicate who and/or what user devices 102 may be eligible to use multiple paths to ePC 208 as well as when user devices 102 may establish such paths.

In addition, PCRF 220 may indicate network conditions under which user device 102 may shift its network traffic from one path to another. User device 102 may obtain one or more such specifications from PCRF 220 through PGW 216.

ePDG 222 may provide a node through which wireless network 106 may access network 202. When user device 102 attaches to network 202 and obtains a first path to ePC 208, user device 102 initiates a network discovery procedure. When user device 102 detects wireless network 106, user device 102 forwards messages to ePDG 222, to establish a second path to ePC 208. The process includes obtaining an IP address from PGW 216 over wireless network 106, and setting up a virtual private network (VPN) tunnel (e.g., IP Sec) between user device 102 and ePDG 222. Thereafter, ePDG 222 may connect to PGW 216, to either establish a IPSec tunnel between ePDG 222 and PGW 216, or to allow PGW 216 to establish an IPSec tunnel between user device 102 and PGW 216.

In some implementations, in which an LTE network takes place of wireless network 106, a PGW of the replacing LTE network (foreign PGW) may assume a role analogous to that of ePDG 222. Thus, after user device 102 connects to the foreign PGW, the foreign PGW may establish an IPSec tunnel with PGW 216, or allow PGW 216 to establish a tunnel, from PGW 216 to user device 102, that passes through the foreign PGW.

In all of the above implementations, on contrast to a PLMN to Wi-Fi handover process, the first path to ePC 208 is not terminated or torn down when the second path is established. Rather, the first path is retained at the same time that the second path exists. During the lifetime of the paths, user device 102 may balance its traffic between the two paths, based on radio access quality, traffic data and information from health packets (e.g., pings or ICMP packets, traceroute packets, etc.). Such use not only allows the second path to act as a redundant path, but as an additional channel through which user device 102 can increase its communication bandwidth.

While FIG. 2 shows exemplary components of networks in environment 100, in other implementations, environment 100 may include fewer components, different components, differently arranged components, or additional components than depicted in FIG. 2. Additionally, or alternatively, one or more components in environment 100 may perform functions described as being performed by one or more other components.

Figure 3:
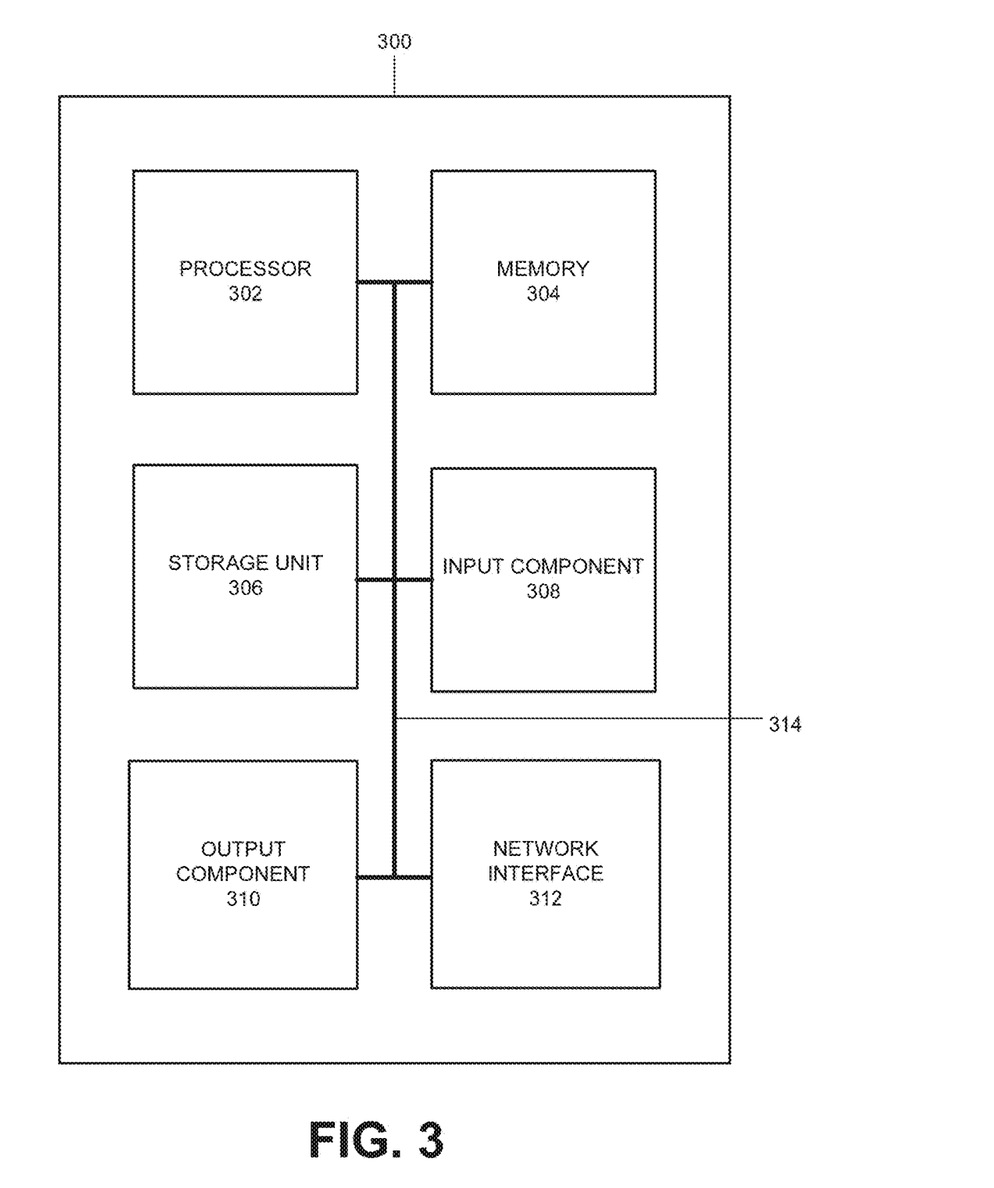
FIG. 3 illustrates exemplary components of network devices of FIGS. 1 and 2.

FIG. 3 is a block diagram of exemplary components of a network device 300. Network device 300 may correspond to or be included in any of the devices and/or components illustrated in FIG. 1 and FIG. 2 (e.g., user device 102, network 104, networks 106, network 202, PDN 204, and components 210-222).

As shown, network device 300 may include a processor 302, memory 304, storage unit 306, input component 308, output component 310, network interface 312, and communication path 314. In different implementations, network device 300 may include additional, fewer, different, or different arrangement of components than the ones illustrated in FIG. 3. For example, network device 300 may include line cards, modems, etc.

Processor 302 may include a processor, a microprocessor, an Application Specific Integrated Circuit (ASIC), a Field Programmable Gate Array (FPGA), programmable logic device, chipset, application specific instruction-set processor (ASIP), system-on-chip (SoC), central processing unit (CPU) (e.g., one or multiple cores), microcontrollers, and/or other processing logic (e.g., embedded devices) capable of controlling device 300 and/or executing programs/instructions.

Memory 304 may include static memory, such as read only memory (ROM), and/or dynamic memory, such as random access memory (RAM), or onboard cache, for storing data and machine-readable instructions (e.g., programs, scripts, etc.).

Storage unit 306 may include a floppy disk, CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Storage unit 306 may be external to and/or removable from network device 300. Storage unit 306 may include, for example, a Universal Serial Bus (USB) memory stick, a dongle, a hard disk, off-line storage, a Blu-Ray® disk (BD), etc. Storage unit 306 may store data, a copy of software, an operating system, application, and/or instructions.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 308 and output component 310 may provide input and output from/to a user to/from device 300. Input/output components 308 and 310 may include a display screen, a keyboard, a mouse, a speaker, a microphone, a camera, a DVD reader, USB lines, and/or other types of components for obtaining, from physical events or phenomena, to and/or from signals that pertain to device 300.

Network interface 312 may include a transceiver (e.g., a transmitter and a receiver) for network device 300 to communicate with other devices and/or systems. For example, via network interface 312, network device 300 may communicate over a network, such as the Internet, an intranet, a terrestrial wireless network (e.g., a WLAN, WiFi, WiMax, etc.), a satellite-based network, optical network, etc. Network interface 312 may include a modem, an Ethernet interface to a LAN, and/or an interface/connection for connecting device 300 to other devices (e.g., a Bluetooth interface).

Communication path 314 may provide an interface through which components of device 200 can communicate with one another.

Network device 300 may perform the operations described herein in response to processor 302 executing software instructions stored in a non-transient computer-readable medium, such as memory 304 or storage device 306. The software instructions may be read into memory 304 from another computer-readable medium or from another device via network interface 312. The software instructions stored in memory 304 or storage device 306, when executed by processor 302, may cause processor 302 to perform processes that are described herein.

For example, when network device 300 is implemented as user device 102, programs on user device 102 may direct user device 102 to establish multiple network paths for a data session, monitor network traffic conditions, and/or select one of the paths for transmitting data. In another example, the programs may cause user device 102 to notify a component in ePC 208 (e.g., PGW 216) when user device 102 selects a particular network path to ePC 208.

Figure 4:
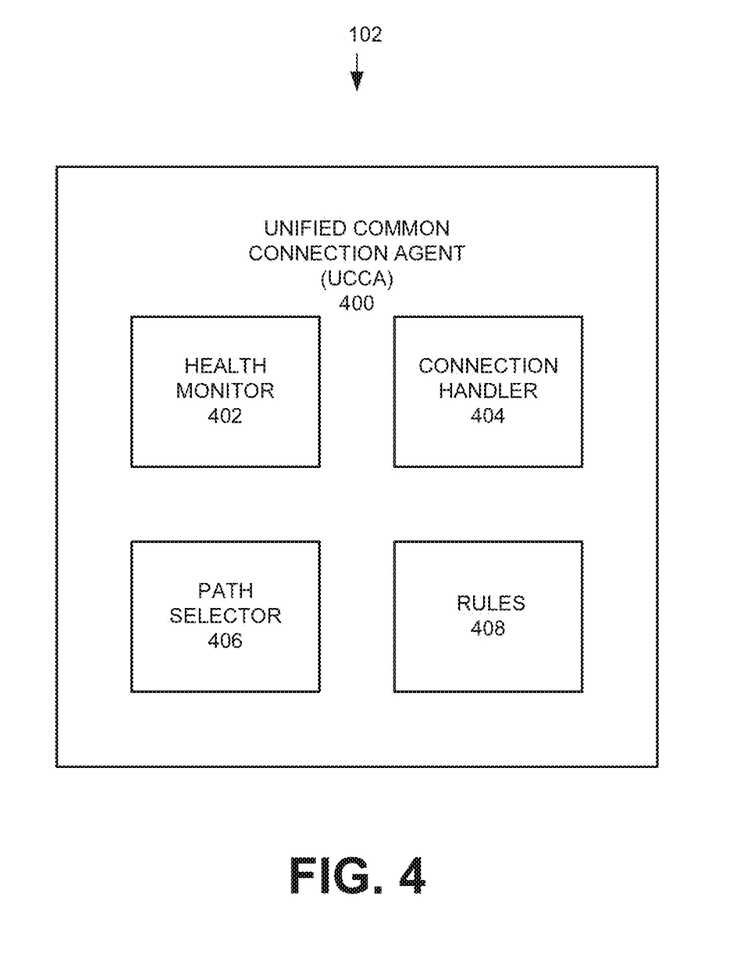
FIG. 4 illustrates exemplary functional components of the exemplary user device of FIGS. 1 and 2.

FIG. 4 illustrates exemplary functional components of exemplary user device 102. As shown, user device 102 may include a Unified Common Connection Agent (UCCA) 400, which in turn includes a health monitor 402, connection handler 404, path selector 406, and rules 408. Although user device 102 may include additional components, for simplicity, they are not illustrated.

Health monitor 402 may determine radio access quality, based on signal to interference ratio, signal to loss ratio, and common pilot signal measurement (e.g., power measurement on the primary common pilot channel) for each of the networks to which user device 102 is attached. The measurement information may indicate the average number of bit errors over the paths. In addition, health monitor 402 may measure network traffic conditions, such as average packet loss, latency, jitter, etc. for each of the networks. Periodically, health monitor 402 may send health packets (e.g., a Internet Control Message Protocol (ICMP) packets) to determine, for example, average network latency, packet loss, etc. Health monitor 402 may provide both radio signal information and network traffic condition to path selector 406 when requested by path selector.

Connection handler 404 may determine whether there are wireless networks (e.g., a Wi-Fi, Wi-Max, WLAN, PLMN, etc.) to which user device 102 may connect. When connection handler 404 determines that a network is available, connection handler 404 may cause user device 102 to start an attachment procedure, without dropping a current connection to a PLMN (e.g., MSP network 202).

Connection handler 404 may obtain an IP address for user device 102 when user device 102 attaches to ePC 208 over a wireless network and establishes a path over the wireless network. In addition, connection handler 404 may maintain an IP address, either obtained from PGW 326 or another device, to maintain a seamless flow of data across multiple paths. For example, user device 102 may assign the IP address to a session endpoint.

Path selector 406 may periodically, or when it is about to transmit data, request health monitor 402 to provide network traffic information and radio signal information. Furthermore, based on the information provided by health monitor 402, path selector 406 may apply rules 408 to determine on which wireless network path to transmit its data. In the implementations in which both of the network paths are used, rules 408 may specify what fraction of data to be sent to the endpoint, should be transmitted over one path versus the other path.

In some implementations, after choosing a particular path, path selector 406 may notify SGW 214 and/or PGW 216 which network path is active for user device 102. If all paths are to be used, path selector 406 may periodically notify SGW 214 and/or PGW 216 what fractions of data should be carried by each of the paths.

Rules 408 may include a database of rules/logic for determining which network path user device 102 should use for communication or what fraction of data should be carried over each of the paths. In some implementations, rules 408 may be updated at or downloaded to user device 102 during an attachment.

Depending on the implementation, UCCA 400 may include additional, fewer, different, or a different arrangement of components than those illustrated in FIG. 4. For example, in some implementations, a component in ePC 208 may provide network communication statistics and UCCA 400 may rely on such statistics for selecting network paths.

Figure 5:
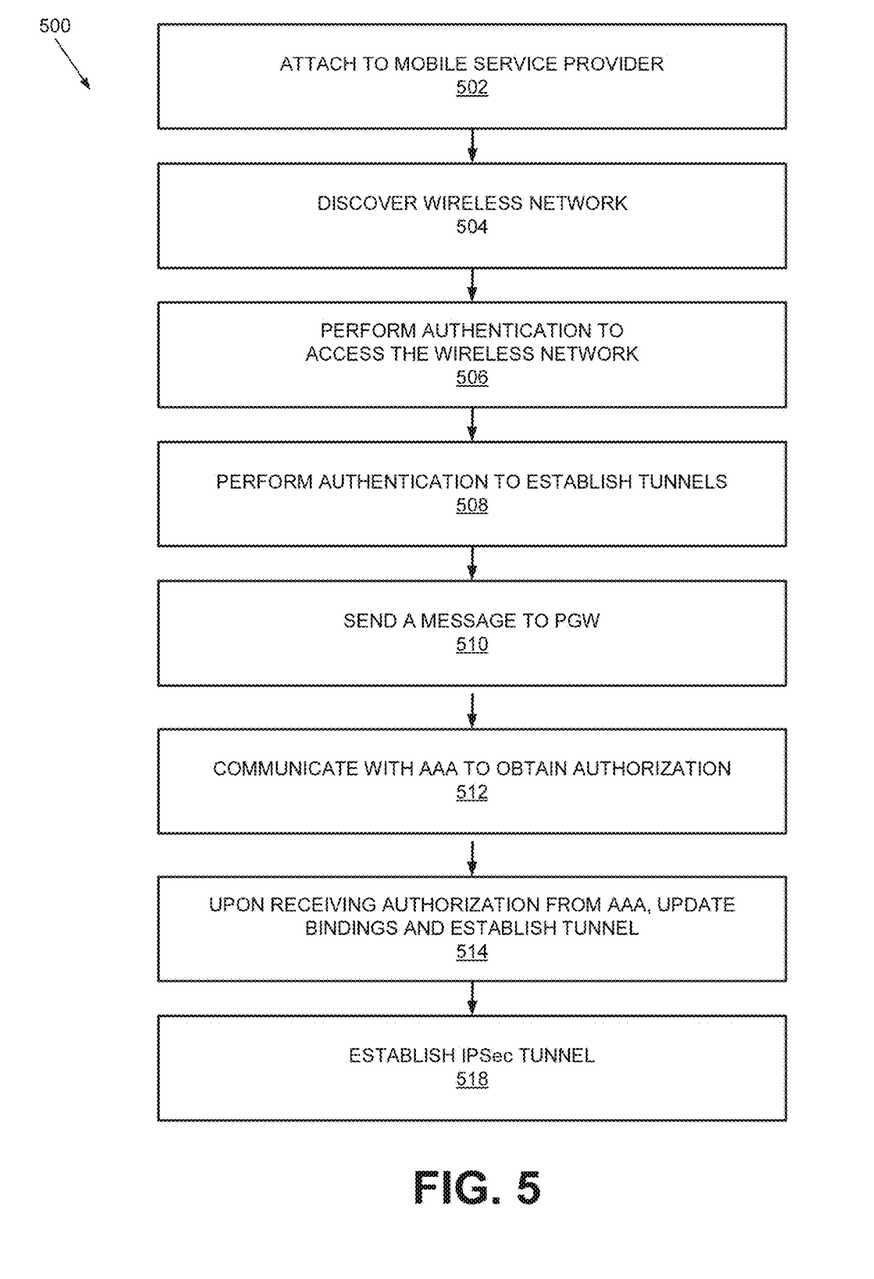
FIG. 5 is a flow diagram an exemplary process that is associated with establishing a data session across multiple wireless networks.
Figure 6:
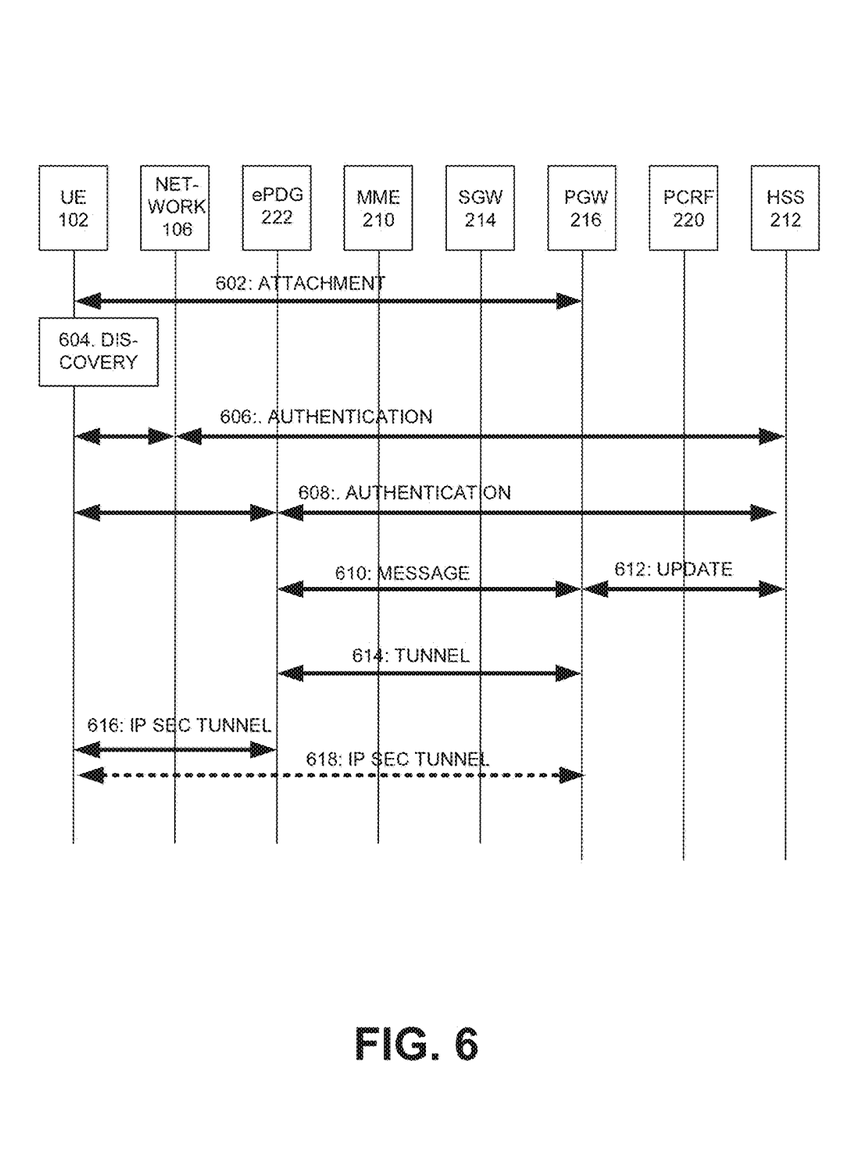
FIG. 6 is an exemplary messaging diagram that is associated with the process of FIG. 5.

FIG. 5 is a flow diagram of an exemplary process 500 that is associated with establishing a data session across multiple wireless networks, and FIG. 6 is an exemplary messaging diagram that is associated with process 500. Process 500 may be performed by one or more of user device 102, eNodeBs 206, MME 210, HSS 212, SGW 214, PGW 216, AAA 218, PCRF 220, and ePDG 222.

As shown in FIG. 5, process 500 may include user device 102 attaching to MSP network 202 (block 502). The attachment process may include, for example, establishing a PMIPv6 tunnel between SGW 214 and PGW 216, bearer identification, etc. The authentication involves not only MME 210, but also HSS 212 that queries AAA 218 for user information. In FIG. 6, this is illustrated with a "messaging arrow" that spans network 106, ePDG 222, MME 210, SGW 214, and PGW 216. During the attachment, PGW 216 assigns an IP address to user device 102.

In response, user device 102 uses one of the received IP addresses for an endpoint of a primary path created between user device 102 and MSP network 202. In addition, using another IP address (which user device 102 has obtained from PGW 216 or previously obtained from another device) is used to designate an endpoint of a session, for which the primary path has been set.

Process 500 further includes user device 102 discovering a wireless network (block 504), which is also illustrated as arrow 604 in FIG. 6. Upon detecting wireless network 106 (e.g., WLAN), for example, user device 102 may take initial steps to connect to wireless network 106.

Depending on configuration of the detected network, user device 102 may perform authentication for accessing the network (block 506), after which user device 102 may authenticate with MSP network 202. This may cause a gateway of ePC 208 at which user device 102 requests access to contact HSS 212, to obtain information required to authorize user device 102. In FIG. 6, user device 101 first accessing ePC 208 is illustrated at 606, with an arrow extending from user device 102 to network 106. The gateway's access to HSS 212 is illustrated with an arrow that extends from network 106 to HSS 212. When contacted from the gateway, HSS 212 may then access AAA 218 for credentials.

When user device 102 is authenticated, UCCA 400 on user device 102 sends packets to ePDG 222. Accordingly, user device 102 and ePDG 222 may perform another set of authentication steps for setting up IKEv2 tunnel between user device 102 and ePDG 222 (block 508). This entails accessing AAA 218, which identifies PGW 216 to ePDG 222. ePDG 222 then messages PGW 216 and HSS 212, after which user device 102 is authorized to use Access Point Name (APN). The APN designates a gateway between MSP network 106 and wireless network 106 and is used to: identify what PDN is used (or to be used), what type of network connection should be created, etc. The arrows for 608 illustrate these steps in FIG. 6.

ePDG 222 sends a message to PGW 216 (block 510) (arrow 610). The message indicates that the path about to be created through wireless network 106 is not for a handover, but for providing an alternate or additional data path for the data session (block 510 and arrow 610). The message also includes: a mobile node network access identifier (MN-NAI); a key to be used for a downlink traffic; and address information for user device 102 (e.g., information that includes the secondary IP address).

Upon receipt of the message, depending on the implementation, PGW 216 may consult PCRF 220 to determine whether UE is permitted to have concurrent network paths through network 202 and wireless network 106 for the same session. Assuming that the logic permits the concurrent paths, PGW 216 then communicates the following information to AAA 218: the identity of PGW 216 and the APN, which corresponds to user device 102's connection to wireless network 106 (block 512 and arrow 612). In response, AAA 218 sends authorization information to PGW 216. Depending on the implementation, PGW 216 may consult PCRF 220 to determine whether multiple paths may be established.

Figure 7:
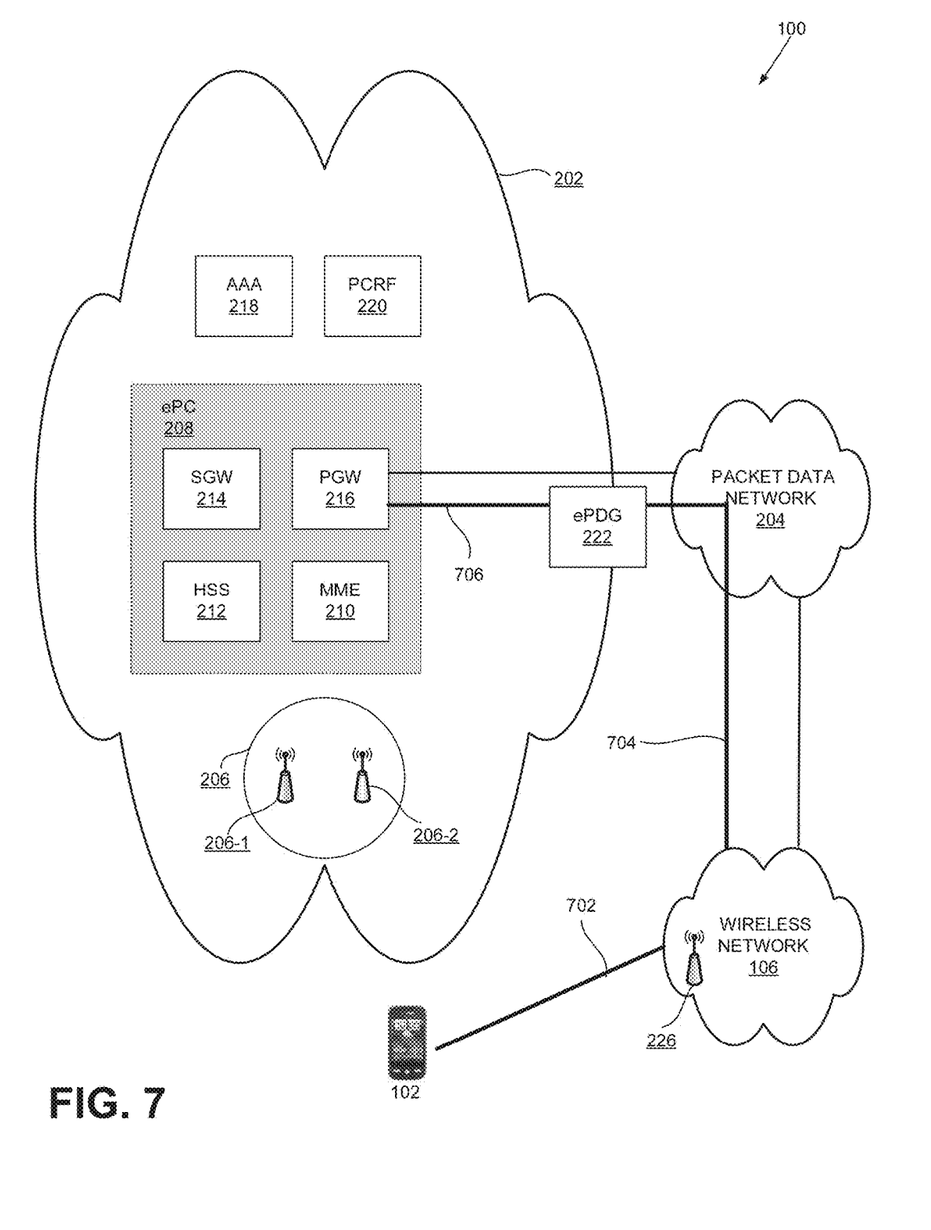
FIG. 7 illustrates a result of setting up a network path between the user device and the evolved packet data gateway of FIG. 2.

After PGW 216 receives the authorization from AAA 218, PGW 216 uses the message sent from ePDG 222 (see block 510) to record the binding of user device 102 (block 514). This step may involve an assignment of a secondary IP address to user device 102. PGW 216 then sends an acknowledgement message to ePDG 222, which includes the secondary IP address.

ePDG 222 and user device 102 conducts further communication to establish a VPN tunnel between them (block 514 and arrow 614), and then establish an IPSec tunnel between ePDG 222 and PGW 216 (block 516 and arrow 616). FIG. 7 illustrates the resulting network path comprising links 702, 704, and 706, over which the IP Sec tunnel is established. In a different implementation, rather than establishing a tunnel between PGW 216 and ePDG 222, PGW 216 may establish an IPSec tunnel between PGW 216 and user device 102 through/over ePDG 222. In this latter case, data traversing between ePDG 222 and user device 102 are twice encapsulated, once in a tunnel between ePDG 222, and a tunnel between user device 102 and PGW 216.

One result of establishing the two paths is that user device 102 has at least three IP addresses during the session. Depending on the implementation, PGW 216 also has knowledge of these IP addresses. If user device 102 has additional network paths through other wireless networks, user device 102 would have an additional IP address for each additional path.

After block 514 and during the session, user device 102 monitors conditions of the network paths through network 202 and wireless network 106. Depending on the conditions of the paths, UCCA 400 in user device 102 selects one of the two paths to send data. In the implementation in which both of the paths are used, user device 102 may load balance the transmission data over the two paths.

In some instances, during a session, a session endpoint (other than user device 102) may send data to user device 102. When packets whose destination is user device 102 arrive at PGW 216, in some implementations, PGW 216 may route the packets to user device 102 through an optimal network path, or, alternatively, distribute the desired amount of traffic over multiple paths.

For example, in one implementation, user device 102 may periodically send a message to PGW 216, to let PGW 216 know which path is optimal or how much load each path should carry. When PGW 216 receives packets that are to be forwarded to user device 102, PGW 216 sends the packets over the path that user device 102 selected most recently. In a different implementation, PGW 216 may maintain (e.g., delay, jitter, radio signal access quality, etc.) its own network metric and select a path based on the metric.

As already discussed above, a different type of network may be used in place of wireless networks 106 to provide additional paths. For example, a foreign PLMN may provide such a path. Also already discussed, should an LTE network provide the extra path, the foreign PGW may provide functionalities that are similar to those of ePDG 222 in providing various edge device functionalities, including those related to setting up and tearing down tunnels.

In this specification, various preferred embodiments have been described with reference to the accompanying drawings. It will be evident that modifications and changes may be made thereto, and additional embodiments may be implemented, without departing from the broader scope of the invention as set forth in the claims that follow. The specification and drawings are accordingly to be regarded in an illustrative rather than restrictive sense.

In the above, while a series of blocks have been described with regard to the processes illustrated in FIG. 5, the order of the blocks may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store or employ personal information provided by individuals, it should be understood that such information shall be used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a", "an" and "the" are intended to include one or more items. Further, the phrase "based on" is intended to mean "based, at least in part, on" unless explicitly stated otherwise.

What is claimed is:

1. A method comprising:
    attaching a device to a mobile service provider (MSP) network,
        wherein the attaching includes establishing a first communication path from the device to a packet data network (PDN) gateway in the MSP network,
        wherein the attaching further includes obtaining, by the device, a first Internet Protocol (IP) address from the PDN gateway, and
        wherein the first IP address represents a first network address of the device;
    starting a session over the first communication path;
    detecting, by the device, a wireless network that is available for establishing a second communication path that extends from the device to the PDN gateway over the wireless network; and
    while the first communication path is intact:
        attaching the device to the MSP network over the wireless network,
            wherein the attaching the device over the wireless network includes establishing a second communication path from the device to the PDN gateway over the wireless network,
            wherein the attaching the device over the wireless network further includes obtaining, by the device, a second IP address from the PDN gateway, and
            wherein the second IP address represents a second network address of the device;
        evaluating conditions for the first communication path and the second communication path;
        selecting one of the first and second communication paths as an active communication path based on the evaluated conditions; and
        transmitting data over the active communication path during the session,
        wherein the device includes a third IP address that is different from the first IP address and the second IP address.

2. The method of claim 1, wherein evaluating conditions includes:
    determining a radio access quality for the first communication path and the second communication path based on at least one of: signal to interference ratio, signal to loss ratio, or common pilot signal measurements.

3. The method of claim 1, wherein establishing a second communication path from the device to the PDN gateway in the MSP network includes:
    establishing a virtual private network (VPN) tunnel between an evolved packet data gateway and the device; and
    establishing a tunnel between the evolved packet data gateway and the PDN gateway, wherein the VPN tunnel and the tunnel are part of the second communication path.

4. The method of claim 1, wherein selecting one of the first and second communication paths as an active communication path includes:
sending a message to the PDN gateway, wherein the message indicates which of the two communication paths is active.

5. The method of claim 4, further comprising:
receiving, at the PDN gateway, packets whose destination addresses is the third IP address; and
forwarding the packets to the device over the active communication path.

6. The method of claim 1, wherein the attaching the device to the MSP network over the wireless network includes:
accessing, by the PDN gateway, an Authentication, Authorization, and Accounting (AAA) device in the MSP network;
receiving, by the PDN gateway, credentials from the AAA device; and
authenticating the device, by the PDN gateway, based on the received credentials.

7. The method of claim 1, wherein the session is a voice-over long-term evolution (VoLTE) session.

8. A device comprising:
a network interface for communicating wirelessly;
a memory for storing instructions; and
a processor configured to execute the stored instructions to:
attach the device to a mobile service provider (MSP) network,
wherein when the processor attaches the device to the MSP network, the processor establishes a first communication path from the device to a packet data network (PDN) gateway in the MSP network,
wherein when the processor attaches the device to the MSP network, the processor obtains a first Internet Protocol (IP) address from the PDN gateway, and
wherein the first IP address represents a first network address of the device;
start a session over the first communication path;
detect, by the device, a wireless network that is available to establish a second communication path that extends from the device to the PDN gateway over the wireless network; and
while the first communication path is intact:
attach the device to the MSP network over the wireless network,
wherein when the processor attaches the device over the wireless network, the processor establishes a second communication path from the device to the PDN gateway over the wireless network,
wherein when the processor attaches the device over the wireless network, the processor obtains a second IP address from the PDN gateway, and
wherein the second IP address represents a second network address of the device;
evaluate conditions for the first communication path and the second communication path;
select one of the first and second communication paths as an active communication path based on the evaluated conditions; and
transmit data over the active communication path during the session,
wherein the device includes a third IP address that is different from the first IP address and the second IP address.

9. The device of claim 8, wherein when the processor evaluates conditions, the processor:
determines a radio access quality for the first communication path and the second communication path based on at least one of: signal to interference ratio, signal to loss ratio, or common pilot signal measurements.

10. The device of claim 8, wherein when the processor establishes a second communication path from the device to the PDN gateway in the MSP network, the processor is to:
establish a virtual private network (VPN) tunnel between an evolved packet data gateway to the device,
wherein the VPN tunnel is part of the second communication path.

11. The device of claim 8, wherein when the processor selects one of the first and second communication paths as an active communication path, the processor is to:
send a message to the PDN gateway, wherein the message indicates which of the two communication paths is active.

12. The device of claim 11, wherein the PDN gateway is configured to:
receive packets whose destination addresses is the third IP address; and
forward the packets to the device over the active communication path.

13. The device of claim 8, wherein the PDN gateway is configured to:
access an Authentication, Authorization, and Accounting (AAA) device in the MSP network;
receive credentials from the AAA device; and
authenticate the device based on the received credentials.

14. The device of claim 8, wherein the session is a voice-over long-term evolution (VoLTE) session.

15. A computer-readable device comprising one or more computer-executable instructions that, when executed by at least one processor of a device, cause the at least one processor to:
attach a device to a mobile service provider (MSP) network,
wherein when the processor attaches, the processor establishes a first communication path from the device to a packet data network (PDN) gateway in the MSP network,
wherein when the processor attaches the device to the MSP network, the processor obtains a first Internet Protocol (IP) address from the PDN gateway, and
wherein the first IP address represents a first network address of the device;
start a session over the first communication path;
detect a wireless network that is available for establishing a second communication path that extends from the device to the PDN gateway over the wireless network; and
while the first communication path is intact:
attach the device to the MSP network over the wireless network, wherein when the device attaches to the MSP network over the wireless network, the processor establishes a second communication path from the device to the PDN gateway over the wireless network,
wherein when the processor attaches the device over the wireless network, the processor obtains a second IP address from the PDN gateway, and wherein the second IP address represents a second network address of the device;
evaluate conditions for the first communication path and the second communication path;
select one of the first and second communication paths as an active communication path based on the evaluated conditions; and
transmit data over the active communication path during the session,
wherein the device includes a third IP address that Is different from the first IP address and the second IP address.

16. The computer-readable medium of claim 15, wherein the instructions for causing the processor to evaluate conditions include instructions for causing the processor to:
determine a radio access quality for the first communication path and the second communication path based on at least one of: signal to interference ratio, signal to loss ratio, or common pilot signal measurements.

17. The computer-readable medium of claim 15, wherein the instructions for causing the processor to establish a second communication path from the device to the PDN gateway in the MSP network include instructions for causing the processor to:
establish a virtual private network (VPN) tunnel between an evolved packet data gateway and the device; and
establish a tunnel between the evolved packet data gateway and the PDN gateway,
wherein the VPN tunnel and the tunnel are part of the second communication path.

18. The computer-readable medium of claim 15, wherein when the processor selects one of the first and second communication paths as an active path, the processor is to:
send a message to the PDN gateway, wherein the message indicates which of the two communication paths is active.

19. The computer-readable medium of claim 15, wherein the PDN gateway is configured to:
receive packets whose destination addresses is the third IP address; and
forward the packets to the device over the active communication path.

20. The computer-readable medium of claim 15, wherein the PDN gateway is configured to:
access an Authentication, Authorization, and Accounting (AAA) device in the MSP network;
receive credentials from the AAA device; and
authenticate the device based on the received credentials.

* * * * *